United States Patent
Delfosse et al.

(10) Patent No.: US 8,926,741 B2
(45) Date of Patent: Jan. 6, 2015

(54) PROCESS FOR MANUFACTURING COLD BITUMINOUS MIXES, COLD BITUMINOUS MIXES WITH CONTROLLED WORKABILITY AND USE THEREOF FOR PRODUCING ROAD PAVEMENTS

(75) Inventors: Frederic Delfosse, Pessac (FR); Mathieu Garbay, Biscarosse (FR)

(73) Assignee: Eurovia, Rueil Malmaison (FR)

( * ) Notice: Subject to any disclaimer, the term of this patent is extended or adjusted under 35 U.S.C. 154(b) by 18 days.

(21) Appl. No.: 13/701,586

(22) PCT Filed: Jun. 1, 2011

(86) PCT No.: PCT/EP2011/059066
§ 371 (c)(1),
(2), (4) Date: Dec. 3, 2012

(87) PCT Pub. No.: WO2011/151387
PCT Pub. Date: Dec. 8, 2011

(65) Prior Publication Data
US 2013/0068135 A1 Mar. 21, 2013

(51) Int. Cl.
*C08L 95/00* (2006.01)
*E01C 19/10* (2006.01)

(52) U.S. Cl.
CPC .............. *C08L 95/005* (2013.01); *E01C 19/10* (2013.01); *E01C 19/1077* (2013.01)
USPC ............................ 106/277; 106/279; 106/280

(58) Field of Classification Search
USPC .......................................... 106/277, 279, 280
See application file for complete search history.

(56) References Cited

U.S. PATENT DOCUMENTS

| | | | | |
|---|---|---|---|---|
| 2,073,907 A | * | 3/1937 | Scullin | 106/280 |
| 4,978,393 A | * | 12/1990 | Maheas | 106/280 |
| 6,156,113 A | | 12/2000 | Pasquier | |
| 7,114,843 B2 | * | 10/2006 | Romier et al. | 366/4 |
| 8,007,657 B2 | | 8/2011 | Mentink et al. | |
| 8,075,681 B2 | * | 12/2011 | De Sars | 106/277 |

(Continued)

FOREIGN PATENT DOCUMENTS

| | | |
|---|---|---|
| AT | 406 375 | 4/2000 |
| EP | 0 384 094 A1 | 8/1990 |

(Continued)

OTHER PUBLICATIONS

International Search Report issued in application No. PCT/EP2011/059066 on Oct. 18, 2011.

*Primary Examiner* — Helene Klemanski
(74) *Attorney, Agent, or Firm* — Foley & Lardner LLP

(57) ABSTRACT

The present invention relates to a process for producing cold bituminous mixes, comprising the following successive steps: a. in a mixer, coating, at ambient temperature, all of the solid mineral fractions with all of the binder in emulsion, and optionally a portion of fluxing agent, over a time interval T sufficient to observe a coating of the mix; then b. at the end of the time interval T, adding the remaining amount of fluxing agent, over a time interval t, such that the T/t ratio is greater than 2, the other mixing conditions of steps a) and b) being otherwise substantially identical. The present invention also relates to cold bituminous mixes, capable of being obtained by the process according to the invention and the use thereof for the production of wearing courses, the production of emulsion-stabilized gravels or the production of storage-grade mixes.

17 Claims, 1 Drawing Sheet

(56) References Cited

U.S. PATENT DOCUMENTS

| | | | | |
|---|---|---|---|---|
| 8,697,182 | B2* | 4/2014 | Delfosse et al. | 427/136 |
| 2006/0127572 | A1* | 6/2006 | Raynaud | 427/212 |
| 2006/0240185 | A1* | 10/2006 | Antoine et al. | 427/201 |
| 2008/0250975 | A1 | 10/2008 | Deneuvillers et al. | |
| 2009/0163624 | A1* | 6/2009 | De Sars | 106/277 |
| 2009/0208655 | A1* | 8/2009 | Delfosse et al. | 427/314 |

FOREIGN PATENT DOCUMENTS

| | | |
|---|---|---|
| EP | 0 524 031 A1 | 1/1993 |
| EP | 0 552 574 A1 | 7/1993 |
| EP | 0 781 887 A1 | 7/1997 |
| EP | 0 900 822 | 3/1999 |
| EP | 1 469 038 A1 | 10/2004 |
| EP | 1 668 184 | 6/2006 |
| EP | 2 072 562 A1 | 6/2009 |
| FR | 2721043 | 12/1995 |
| FR | 2 732 239 | 10/1996 |
| FR | 2785603 | 5/2000 |
| FR | 2891838 | 4/2007 |
| FR | 2910477 | 6/2008 |
| WO | WO-2006/070104 | 7/2006 |
| WO | WO-2008/077888 | 7/2008 |

* cited by examiner

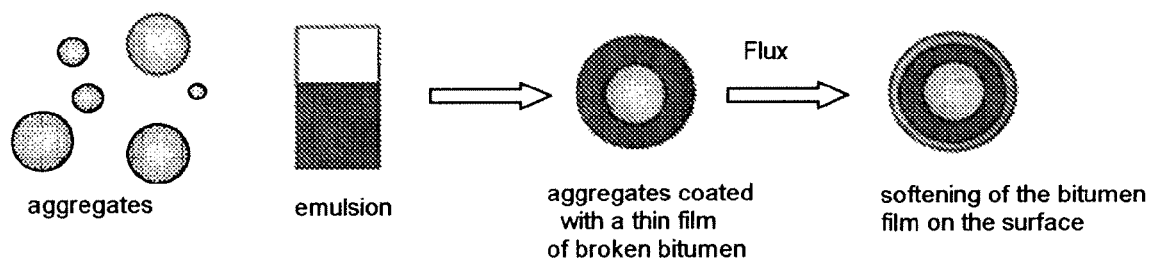

PROCESS FOR MANUFACTURING COLD BITUMINOUS MIXES, COLD BITUMINOUS MIXES WITH CONTROLLED WORKABILITY AND USE THEREOF FOR PRODUCING ROAD PAVEMENTS

The present invention relates to a process for producing mix asphalt, mixes, cold mix asphalt with controlled workability and their use for producing road surfaces.

Among the bituminous mixes, two main categories are found: hot mix asphalt and cold mix asphalt.

Hot mix asphalt are obtained by hot-mixing aggregates and a binder. This binder can be pure or modified bitumen (for example, addition of polymer (S), fluxing agents of petroleum or vegetable origin), pure or modified vegetable binder or a synthetic binder of petroleum origin. Aggregates are heated, generally to a temperature in excess of 100° C.

These mix asphalt show good coating properties, as well as good workability and mechanical properties, after application and cooling, that meet the expectations of the person skilled in the art. Their adaptation to on-site traffic conditions or application is carried out by selecting an appropriate binder. In general it is not necessary to sequence the granular fractions and binder mixing steps.

Nevertheless, increasing environmental restrictions and the rising cost of fuel for heating the materials have led to companies developing cold mix asphalt. The term cold mix asphalt refers to "a bituminous mix composed of aggregates, a hydrocarbon binder and possibly adhesion agents and/or additives whose characteristics allow coating without drying and heating of aggregates", definition of standard NF P 98-149 (Terminology for bituminous mixes).

Thus, cold mix asphalt are produced by coating all of the aggregates (of which the totality of the 0/D fraction) with a bituminous binder. The bituminous binder is usually in the form of an emulsion or foam. This binder is bitumen, bitumen modified by polymers, a synthetic petroleum binder and/or a vegetable binder. The binder can be fluxed or fluidized by products of petroleum or vegetable origin.

The manufacturing temperature for these mix asphalt, which is close to room temperature (the minimum recommended temperature is about 10° C., the range therefore advantageously extends from 10° C. to 40° C.), gives the binder, after breaking of the emulsion for a binding emulsion, a very important role in the workability and compactability of the mix asphalt. In this temperature range, the considerable viscosity of the binder reduces the compactability of the mix asphalt and consequently decreases the mechanical properties of the mix asphalt obtained.

In addition, the quality of the coating can be mediocre with stripping taking place: poor distribution of the bitumen layer over the whole granular fraction, which is even higher as a function of the fluxing agent or fluidizing agent content. The more the granular fraction contains fine granules, the worse the distribution of the binder in the granular fraction (mainly on large elements).

In order to remedy or limit this problem of loss of compactability and poor distribution of the bitumen film over the totality of the granular fraction, the granular fraction and binder mixing step must be sequenced.

A first method consists in carrying out double coating. To remedy the problems of cold coating, patent EP0384094 thus describes a process for the production of storable dense bituminous mixes consisting of 0/D materials or elements coated in a fluxed or fluidized bitumen based binder. This consists in separating the materials into two granule sizes, the first containing the smaller elements and the other the remaining elements; in coating the smaller elements using a first emulsion of bituminous binder; in coating the remaining elements using a second emulsion of bituminous binder whose viscosity is considerably greater than that of the first emulsion, followed by mixing all the 0/D elements together for few seconds. This process produces very well coated and storable bituminous mix but, which on application, presents the risk of surface rutting under heavy traffic, especially when the binder used for coating small elements has very low viscosity.

The second method proposed consists in sequentially coating the 0/D and d/D granular fractions in the same mixer. Thus Patent EP 0524031 describes a sequencing process in which the following are successively added to the mixer: the large elements (d/D fraction), a first emulsion, the small elements (0/d fraction) and a second emulsion. This is mixed for a sufficient period of time to obtain an homogeneous mixture that can be stored for the necessary period of time. Formulas of the two emulsions can be different. The binders used are pure bitumen or fluxed bitumen. The term "large elements" covers elements whose diameter is between 2 and 31 mm and the term "small elements" refers to elements whose diameter is between 0 and 2 mm. Patent EP 0781887 also describes a sequencing process comprised of the following steps:

Introduction into the mixer of large elements (diameter between 2 and 20 mm)

Introduction of a first emulsion at concentration leading to a homogeneous and even binding film on the large elements Introduction of small elements, and Introduction of a second emulsion at concentration leading to total coating of the mixture, characterised in that the second emulsion is obtained from the first emulsion during mixing by the addition of an agent. This agent consists of surfactants, hydrochloric acid, water and a petroleum fluidizing agent.

The first emulsion consists of pure or modified bitumen and is described as an emulsion of the type ECM 65 or ECM 69 with a breaking index below 140. The role of the agent is to modify this first emulsion to obtain ready-to-use or ready-to-transport bituminous mixes to the place of use.

In order to improve the properties of the bituminous mixes obtained according to these different methods (coating lacunae as a function of sand content, insufficient mechanical properties linked to too much fluxing agent, poor distribution of the bitumen layer, etc.), various processes have been proposed, for example processes comprising a heating step:

Process described in application EP 0552574: process for the two step manufacture of road bituminous mixes characterised in that a first phase of the granular part undergoes hot pre-coating (100-200° C.) with the aid of an anhydrous binder in a proportion sufficient to ensure that after cooling, the material is not cohesive, then carrying out cold coating of the whole material and, if need be, of a granular complement, using a binding emulsion;

Process described in application FR 2732239: the cold mix is obtained with an emulsion of the binder then taken up in a heater which, without drying out the water in which it is found, makes a mild coating or a hot mix asphalt. The binder is thus softened and makes it possible to obtain a mix asphalt presenting, after application and compacting, improved mechanical properties. In the same vein, patent EP 1668184 suggests reheating a cold mix asphalt by proposing a narrower heating temperature band for the coating between 30 and 60° C.

These different processes, all aimed at improving the performance of cold mix asphalt, are based on heating steps to facilitate coating and/or to improve the compactability of the coating. Compared to various cold processes, the latter use more fuel which affect the analysis of the life cycle of this type of coating.

The object of the invention is a process for manufacturing cold mix asphalt consisting of solid mineral fractions coated with an emulsion binder, said binder comprising a fluxing or fluidizing agent characterised in that it consists of the following steps:

a. In a mixer, at room temperature, coat the totality of solid mineral fractions with an emulsion binder, said emulsion comprising the totality of the binder but not containing the totality of the fluxing or fluidizing agent, for a time period T sufficient to observe coating of the mix asphalt; then
 b. At the end of the time interval T, add the remaining quantity of fluxing or fluidizing agent, and if need be an additive suited to the nature of the fluxing or fluidizing agent, in a mixer for a time interval t such that the T/t ratio is greater than 2, the other mixing conditions for steps a) and b) being moreover almost identical.

Steps a) and b) are carried out at room temperature (advantageously between 10° C. and 40° C.): the solid mineral fractions and emulsion binder do not undergo the heating or reheating step.

Cold mix asphalt obtained by this process show good quality coating (at least equivalent to that found with hot mix asphalt) without the disadvantages observed with the processes of the prior art, in other words without the problem of stripping, even with high contents of fluxing or fluidizing agent. Adaptation of fluxing or fluidizing agent content should make it possible to adjust the rheology of the binder to the targeted field of application: storable mixes, cold mix asphalt for wearing course or for roadbase layers. Moreover no heating or reheating step, especially to modify the rheological properties of the binder or to make hydrophobic one part of the aggregate and/or manufactured cold mix asphalt is necessary. Cold mix asphalt obtained by the process according to the invention therefore satisfy the requirements of standard NF P 98-149. In addition, fuel consumption is low.

It was found that the addition of fluxing or fluidizing agent at the end of mixing, and if need be of an additive suited to the nature of the fluxing or fluidizing agents during mixing or at the end of mixing, advantageously at the end of mixing, makes it possible to modify the rheology of the cold mix asphalt when it is applied and thus reduces the viscosity of the binder what enhances compactability but also increases the cohesion of the mix asphalt.

Step a) is carried out for a time period T sufficient to observe breaking of the emulsion which is at an advanced stage but not necessarily complete. The breaking kinetics are evaluated by removing 10 g of mix asphalt from the mixer which is then mixed with 50 g of water: if the emulsion breaks, the water remains translucent; otherwise the water becomes coloured (grey/black for bitumen, whitish for a vegetable binder). The person skilled in the art can thus establish the quality of the mix visually.

The time interval t must be short enough so that no stripping is observed, especially when content in fluxing or fluidizing agent is high. In fact we have found that if the mixing time during step b) is too long, the mix asphalt obtained once again present the disadvantages observed with the processes of the prior art (poor distribution of the binding film throughout the granular fraction). The time interval t is short and must not be too long. It is assumed that the time interval t must be such that the fluxing or fluidizing agent remains at the surface of the mix asphalt; the time interval t must be sufficiently short to limit diffusion of the fluxing or fluidizing agent.

The T/t ratio is dependent on the overall quality of fluxing or fluidizing agent (it can be increased when the total quantity of fluxing agent is increased). It is also dependent on the point at which the fluxing or fluidizing agent is added: the greater the quantity of fluxing or fluidizing agent present during step a), the higher the T/t ratio is.

The time interval t is also be dependent on the adhesion energy between the binder and solid mineral fractions. The higher this adhesion energy, the longer the time interval t will be. Adhesion energy is measured by the Duriez test as defined in standard NF P98-251-4 (August 2004 version): determination for two compacting methods of the percentage of void and water content at 18° C. from the ratio of resistance to compression with and without immersion of test tubes.

The t/T ratio is advantageously greater than 3. The T/t ratio is advantageously between 2 and 6, more advantageously between 3 and 5.

Steps a) and b) can be successive and continuous or the process can be stopped after step a), before carrying out step b) (for example storage). According to an advantageous variant of the invention, steps a) and b) can be carried out in one and single mixer, step b) being carried out directly at the end of the time interval T, without a long break between steps a) and b). A long break refers to storage of the mix.

When steps a) and b) are carried out successively without a break, the duration of step h) is significantly shorter than that of step a). The T/t ratio is advantageously greater than 3. The mixers are advantageously a one and the same mixer but two different mixers in theory can be used.

When steps a) and b) are not successive but where there is a break due to storage of the mix asphalt obtained after step a), the time period t is established case by case by the person skilled in the art, recalling that it must be such that no stripping is observed and that the fluxing and fluidizing agent remains at the surface of the mix asphalt. Storage, mainly when the mix asphalt obtained following step a) do not include a fluxing or fluidizing agent, can increase the adhesion energy between the binder and the solid mineral fraction with, as a consequence, that the time interval t can be longer before stripping takes place. The inventors nonetheless consider that it is of no benefit to increase the duration of this time interval t.

The T/t ratio can be adapted to each particular case by preliminary studies, at the laboratory scale or directly on site, which do not go beyond the normal work of the person skilled in the art.

The fluxing agent is advantageously a fluxing agent of petroleum or petrochemical origin. A petroleum fluxing agent is a product resulting from the distillation of crude petroleum (light fraction having possibly undergone hydro processing operations). In particular the fluxing agent is chosen from the group comprised of fluxing agents sold by Total (Greenflux® 2000®, Greenflux S. Dak.). A petrochemical fluxing agent is a product resulting from the distillation of crude petroleum (light fraction) having undergone at least one thermal cracking operation and additional distillation. In particular the fluxing agent is chosen from the group comprised of fluxing agents sold by VFT France (Adheflux®).

The fluxing agent is advantageously a fluxing agent of carbochemical origin. A carbochemical fluxing agent is a product resulting from the pyrolysis of coal, having undergone at least one distillation process.

The fluxing agent is advantageously a fluxing agent of natural non fossil origin (vegetable or animal origin). A fluxing agent of natural non fossil origin is a natural, non fossil oil, their derivatives such as fatty acid esters or mixtures thereof. These fluxing agents of natural non fossil origin are well known to the person skilled in the art.

Preferentially, vegetable oils such as sunflower, rapeseed, peanut, coconut, linseed, groundnut, soya, olive, castor, maize, marrow, grape seed, jojoba, sesame, nut, hazelnut, tung, tall, or their derivatives as well as mixtures thereof are used. For example the fluxing agent is chosen from the group comprised of fluxing agents sold by Oléoroute (Oleoflux®).

In particular, the fluxing agent of natural non fossil origin is chosen from the group comprised of:
- esters of glycolic, lactic or gluconic acids, methyl, ethyl and isobutyl esters of glutaric, succinic and adipic acids, and mixtures thereof (as described in application WO2006070104);
- ethers or esters of a product resulting from the internal dehydration of a sugar, preferably a hydrogenated sugar, in particular an ether or ester of isosorbide, sorbitan, isommanide, mannitan, isodide or iditan, or a mixture of at least two of these products, more advantageously dimethylisosorbide (as described in application WO2006070104);
- acids, esters, in particular mono esters of which methyl-monoesters, or amides, possibly functionalised by oxidation, obtained from vegetable or animal oils (oils of pine, sunflower, rapeseed, linseed, castor, groundnut, coconut, olive, palm kernel, marrow, grape seed, argan, jojoba, sesame, coconut, hazelnut, tung, rice—as described in applications FR 2 785 603, FR 2 910 477, EP 900 822, FR 2 721 043 OR FR 2 891 838), and mixtures thereof;
- heavy oils of mineral origin, animal and vegetable oils and fats, and their derivatives functionalised with trans-esterification products and saponification products and their mixtures, organic mono-, di- or tri-carboxylic acids, saturated or unsaturated, having 6 to 24 carbon atoms that can be branched (as described in application AT 406 375);

and mixtures thereof.

The fluidizing agent is advantageously a mixture of light petroleum cuts such as kerosene or white spirit.

Among these fluxing or fluidizing agents, fluxing or fluidizing agents with controllable siccative properties are preferred, in other words fluxing or fluidizing agents that autoxypolymerise under the action of air, especially due to the presence of an oxidizable functional group (chosen from among the carboxylic acid, carboxylic di-acid, epoxide, peroxide, aldehyde, ether, ester, alcohol and ketone groups) or an unsaturation other than a ring (double bond, triple bond). The presence of oxygen atoms on the molecules of the fluxing agent makes it possible to form oxygen bridges between molecules of the fluxing agent and/or molecules of the fluxing agent and other constituents of the mixture such as the binder. The presence of unsaturations allows the formation of oxygen bridges from oxygen in the air by means of a radical reaction. When the fluxing agent is a fluxing agent of natural non fossil origin, especially a vegetable oil or fatty acid monoester and an alcohol, it advantageously has an iodine index greater than or equal to 120, reflecting its ability to react with oxygen in the air.

Among these fluxing or fluidizing agents, we can also use volatile fluxing agents or fluidizing agents such as solvents of petroleum origin.

One or more of these fluxing or fluidizing agents can be used alone or in mixture.

Additives as a function of the type of fluxing or fluidizing agent and field of application can be added either during mixing or at the end of mixing, advantageously at the end of mixing in order to enhance cohesion build-up of the mix asphalt. The addition at the end of mixing of an additive suited to the nature of the fluxing or fluidizing agent can lead to improved cohesion build-up of the mix asphalt.

Amongst these additives, the following can be cited:
- siccatives resulting in oxidation kinetics of fluxing or fluidizing agents of vegetable origin: metal salts in particular an octoate or naphthenate of cobalt, manganese or zirconium;
- cement
- lime
- calcium chloride.

Through an oxidation, polymerisation or other reaction of the fluxing or fluidizing agent, these additives make it possible to limit the effect of the fluxing or fluidizing agent in time: provision of fluidity reduced in the course of time by blockage of the fluxing or fluidizing agent. For example when the fluxing agent includes an organic carboxylic tri-acid with 6 to 24 carbon atoms (trimer; mixed with monomers and dimers), the addition of cement or lime leads, for example, to the formation of chelates: after a certain period of time, the tri-acid can no longer fulfil its role as a fluxing agent.

It is in fact desirable that the consistency of the binder is such that it allows good wetting of aggregates and that consequently the consistency of the binder evolves so that the mix asphalt obtained acquire mechanical performances making them suitable for usage on roads (good compacting of the coated bitumen when used), as rapidly as possible.

By choosing the fluxing or fluidizing agent/additive pair on the basis of general knowledge of the person skilled in the art, the fluidity of the binder is adapted according to requirements. The quantity of additive compared to content in fluxing or fluidizing agent is determined by the person skilled in the art on the basis of his general knowledge.

In the process of the invention at least a part of the fluxing or fluidizing agent is introduced in step b). Advantageously the majority of the fluxing or fluidizing agent is introduced in step b (over 50% by weight, relative to total weight of the fluxing agent, advantageously over 75% by weight). According to an advantageous variant of the invention, the totality of the fluxing or fluidizing agent is introduced in step b.

The addition of fluxing or fluidizing agent at the end of the process makes it possible to have a binder around the solid mineral fraction presenting a viscosity gradient. This gradient leads to:
- better compactability of mix asphalt for lower total fluxing or fluidizing agent contents. The presence of a fluxing or fluidizing agent in the binder at the periphery of the solid mineral fractions alone is sufficient to achieve good compactability.
- less sensitivity to stripping. The presence of a more viscous binder on contact with the solid mineral fraction makes it possible to achieve higher adhesion energy.

The quantity of fluxing or fluidizing agent is determined as a function of the area of use of the mix asphalt. Low fluxing or fluidizing agent content will be desirable for mix asphalt used in the roadbase or wearing course layer while higher content will be desirable for storable mixes.

For cold mix asphalt intended for use for the wearing course or roadbase layer, we advantageously introduce, as a function of the type of fluxing agent, 1 to 20% by weight of fluxing or fluidizing agent relative to binder weight, preferably 1 to 12% by weight of fluxing or fluidizing agent compared to binder weight. For storable cold mix asphalt, content in fluxing or fluidizing agent will advantageously be between 10 and 40% by weight relative to binder weight, preferably 15 to 25% by weight relative to binder weight. These quantities will be adapted following workability tests (Nynas workability meter; measured according to the method described in the article "bitumen emulsions for cold mixes: Nynas workability meter test", World Conference on Emulsions, 2002) in the case of storable mixes and/or by module measuring tests in time for other types of mix asphalt.

The fluxing or fluidizing agent can be introduced as such. According to one variant the fluxing or fluidizing agent will have been previously produced as an oil-in-water emulsion, said emulsion containing no binder in order to enhance its dispersion in the coated product. This emulsion requires the use of an amphoteric, non-ionic, anionic or cationic emulsifier, classically used by the person skilled in the field of road surfacing.

The term "solid mineral fractions" refers here to all solid fractions that can be used to produce mix asphalt, especially for road construction, comprising notably natural mineral aggregates (fine gravel, sand, grit) originating from quarries or gravel pits, recycling products such as coating aggregates resulting from the recycling of materials recovered in the course of road repair operations, as well as surpluses from coating plants, manufacturing scrap, aggregates originating from the recycling of road materials including concrete, slag particularly dross, shale particularly bauxite or corundum, rubber powders resulting from the recycling of tyres, artificial aggregates of all origins, for example resulting from household waste bottom ash, as well as mixtures thereof in all proportions.

Natural mineral aggregates include:
elements under a size of 0.063 mm (filler or fine)
sand whose constituents range between 0.063 and 2 mm in size;
small gravel whose constituents have dimensions
between 2 mm and 6 mm;
greater than 6 mm The size of mineral aggregates is measured by means of the test described in standard NF EN 933-2 (May 1996 version).

The term "coating aggregate" means mix asphalt of (mixture of aggregates and bituminous binders) originating from ground road surface slabs, crushed asphalt pavement slabs, pieces of coated slabs, coated mix waste or production surpluses (production surpluses are coated or partially coated materials in the factory resulting from temporary manufacturing steps). These elements and other recycling products can be up to 31.5 mm in size.

The "solid mineral fractions" are also called "0/D mineral fractions".

This 0/D mineral fraction can be separated into two granule sizes: the 0/d mineral fraction and the d/D mineral fraction.

The smaller elements (the 0/d mineral fraction) will be those falling within the range of 0 and a maximum diameter that can be set between 2 and 6 mm (0/2 to 0/6), advantageously between 2 and 4 mm. The other elements (minimum diameter greater than 2, 3, 4, 5 or 6 mm; and up to about 31.5 mm) constitute the d/D mineral fraction.

According to the process of the invention, cold mix asphalt can be produced without sequencing the solid mineral fractions or by sequencing these fractions in the same mixer or in two parallel mixers or by double coating (preliminary coating of a fraction) by a pure binder emulsion or fluxed binder. According to an advantageous variant of the invention, prior to step a), the 0/D mineral fraction undergoes a step by which the d/D mineral fraction is coated at room temperature with a binding emulsion. It was found that preliminary coating of the d/D mineral fraction can increase adhesion between the binder and aggregates. Use of a hard grade binder (with needle penetrability at 25° C. below 100 $1/10^{th}$ of mm, advantageously below 50 $1/10^{th}$ mm) ensures better stability of the coated fraction during storage. This pre-coating increases the adhesion energy between the solid mineral fractions and the binder, with the result that the duration t of step b) can be longer.

According to another variant of the invention, in the case of specific mix asphalt and greater energy consumption, prior to step a) the 0/D mineral fraction undergoes a step by which the 0/d mineral fraction undergoes hot (T>100° C.) or warm (room temperature <T<100° C.) coating by a binder, by one of the many methods described in the literature. The binder can be a bitumen foam, bitumen to which wax is added, in the presence of water with a binder at high temperatures (>100° C.), with a bitumen emulsion at 90° C.

Depending on the petrographic nature of the aggregate, preliminary pre-coating (of the d/D fraction according to the first variation or of the 0/d fraction according to the second variant) followed by a drying time of a few minutes to a few days improves the binder/aggregate adhesion. This time will be optimised as a function of the percentage of fluxing or fluidizing agent to be added as a function of the field of use. These different times are established in the laboratory by coating assays as a function of mixing times and sensitivity to water (Duriez test NF P98-251-4, August 2004 version). Advantageously, the first variant according to which preliminary pre-coating of the d/D fraction followed by drying time of a few minutes to a few days allowing improved binder/aggregate adhesion is used.

Thus in one embodiment, the second variant is not used.

It is also possible to envisage sequencing step a). Thus for example step a) can be sequenced as follows:
(i) in a mixer, coat at room temperature one part F1 of the solid mineral fractions with a binder in emulsion L1,
(ii) in the same mixer or in another mixer in the series, coat at room temperature the remaining part F2 of the solid mineral fractions with the binder in the remaining emulsion L2, parts F1 and F2 together constituting the totality of the solid mineral fractions, binders L1 and L2 together constituting the totality of the binder which can include a fluxing or fluidizing agent (but not the totality of this agent) and the time interval T being counted as of the start of step (i) until the end of step (ii).

The process of the invention allows the manufacture of cold mix asphalt mixes, even when the mineral fraction includes a substantial quantity of fines. In an advantageous variant of the invention, the solid mineral fractions include, by weight relative to total weight, at least 20% of the 0/d mineral fraction, advantageously at least 30% of the 0/d mineral fraction. The 0/d fraction can also represent up to 40 to 50% by weight of solid mineral fractions.

In the 0/D fraction, content in elements below the size of 0.063 mm is advantageously 2 to 17% by weight, more advantageously about 2 to 12% by weight, even more advantageously about 3 to 9% by weight and even more advantageously about 5 to 8% by weight (relative to the total weight of the 0/D fraction).

The presence of a significant amount of fines makes it possible to increase the module of the obtained cold mix asphalt. The presence of a large amount of fines makes it possible to obtain a more cohesive mix asphalt. Moreover the mix asphalt will be less sensitive to water because it is less porous. The surface roughness of the mix asphalt will be improved once spread.

The process of the invention makes it possible to overcome the coating defects observed with fluxed bitumen emulsions as a function of their content in 0/d fraction in the coating formula.

The term "binder" refers to any hydrocarbon binder of fossil or vegetable origin that can be used to produce mixes, notably bitumen which is pure or modified by the addition of polymer(s).

The role of the binder is to provide a black colour, in other words to coat well. It cannot provide workability.

The binder can be a soft to hard binder, advantageously of a grade ranging from 10/20 to 160/220. According to the variant of the invention in which the mineral fractions are not previously pre-coated, we prefer using a binder with a grade greater than or equal to 50/70, more advantageously binders of grade 50/70, 70/100, 100/150 or 160/220. According to the variant of the invention in which the mineral fractions undergo preliminary pre-coating, and with a resting time, the pre-coated binder used is advantageously a hard binder, more advantageously a binder of grade 20/30, 35/50 or 50/70.

The binder can include additives that are currently used in roadway surfacing such as polymers (EVA, SBS, SB) reticulated or not, rubber powders, waxes of vegetable or petrochemical origin, bonding agents.

The total binder content is advantageously 2 to 8 ppc (part percent by weight), advantageously 3 to 7 ppc, more advantageously 3.5 to 5.5 ppc relative to the weight of the solid mineral fraction.

This binder content corresponds to the amount of binder introduced as such (binder supply) plus the amount of recovered binder of coated aggregates making up part of the solid mineral fraction. The content in supplied binder can be none or simply between 0 and 2 ppc (relative to the weight of the solid mineral fraction) if the solid mineral fraction consist exclusively of coated aggregates. According to an advantageous variant of the invention, content in supplied binder is at least 1 to 2 ppc, relative to the weight of the solid mineral fraction.

This binder is in the form of an emulsion. Part of the binder can nevertheless be in the form of binding foam. In particular according to the variant of the invention in which the Old mineral fractions undergo preliminary pre-coating, the pre-coating binder can be exclusively or partially in the form of a binding tbarn, a binder with additives; the binder used after this will be in the form of an emulsion.

The term binding foam refers to an injection process when the binder arrives of an amount of water and possibly of air, air being pure or containing additives which modify the adhesion—and even the rheological—properties of the binder.

The emulsion is a dispersion of the binder (bitumen or vegetable binder) in water, the latter being the continuous phase of the system. A surfactant can be added to the emulsion which helps stabilise it.

In the course of the production of an emulsion, the binder is dispersed in fine droplets in water, for example through mechanical action. The addition of a surfactant forms a protective film around the droplets preventing them from agglomerating and thus making it possible to maintain a stable mixture and to store it for a certain period of time. The amount and type of surfactant agent added to the mixture determines the stability of the emulsion to be stored and influences the cure time during resting. The surfactant can be positively charged, negatively charged, amphoteric or non-ionic.

The surfactant is advantageously of petroleum, vegetable, animal origin and mixtures thereof (for example the surfactant can be of vegetable and petroleum origin).

The surfactant can be a fatty acid alkaline soap: the sodium or potassium salts of an organic acid (resin for example). The emulsion is then anionic.

The surfactant can be an acid soap which is generally obtained by the effect of hydrochloric acid on one or two amines. The emulsion is then cationic.

Among the relevant surfactants for this application, the following can be mentioned: surfactants sold by Akzo NOBEL (Redicote® E9, Redicote® EM 44, Redicote® EM 76), surfactants sold by CECA (Dinoram® S, Polyram® S, Polyram® L80), and surfactants sold by Meadwestvaco (Indulin® R33, Indulin® R66, Indulin® W5).

One or several of these surfactants can be used, alone or in mixture.

The process of the invention makes it possible to obtain mix asphalt presenting lower void contents (advantageously at least 2% lower), compared to a mix asphalt comprising a mineral fraction of the same petrographic nature obtained by processes of the prior art. The process of the invention makes it possible to improve the compactability of the mix asphalt thus obtained.

The object of the invention is also cold mix asphalt likely to be obtained by the process of the invention, characterised in that their content in elements of size below 0.063 mm is from 2 to 17% by weight, advantageously 2 to 12% by weight, more advantageously 3 to 9% by weight, even more advantageously 5 to 8% by weight, relative to the total weight of the 0/D fraction according to standard NF 98-139.

The cold mix asphalt according to the invention include a solid mineral fraction as described previously characterised by its high fine content.

The cold mix asphalt according to the invention comprise a fluxing or fluidizing agent, and if need be an additive adapted to the nature of the fluxing or fluidizing agent such as defined earlier and in the amounts described earlier. This fluxing or fluidizing agent is advantageously present in a polymerised form, notably after reaction with oxygen in the air.

The binder present in the cold mix asphalt according to the invention will be that described previously. Total content in binder is as described previously. The surfactants used to produce the binder emulsion are as described previously.

Cold mix asphalt according to the invention advantageously have good workability: workability tests (Nynas workability meter; measured according to the method described in the article "Bitumen emulsions for cold mixes: Nynas workability meter test", World Conference on Emulsions, 2002) is below 200 N at the relevant time as a function of the field of application. For example, for roadbase or wearing course, workability must be below 200 N after 4 hours, in the case of usage without preliminary storage of manufactured mixes.

Cold mix asphalt according to the invention advantageously have low void content. In comparison to mix asphalt including a mineral fraction of the same petrographic nature, obtained by processes of the prior art, the void content of cold mix asphalt according to the invention is advantageously reduced to less than 2%, more advantageously to less than 3%, even more advantageously to less than 4% (measured by the Duriez test tube method according to standard NF P98-251-4, mode 2 (August 2004 version)).

Another object of the invention is the use of cold mix asphalt according to the invention for the manufacture of wearing course. Cold mix asphalt according to the invention are particularly well suited to maintenance work but can also be used for new or renovation work. They are particularly well suited to the production of wearing courses for low to moderate traffic.

Another object of the invention is the use of mix asphalt mixes according to the invention for the production of grave emulsions. These grave emulsions are then used for the production of roadbase or wearing course layers. The cold mix asphalt according to the invention are particularly well suited to maintenance work but can also be used for new or renovation work. The grave emulsions can be non-covered or covered with a coating or with mix asphalt.

Another object of the invention is the use of cold mix asphalt as described previously for the production of mixes which can be stored.

FIG. 1 represents the manufacturing process for cold mixes according to the invention: aggregates are mixed with the binding emulsion. At the end of the mixing step but after the emulsion is homogeneously broken on 0/D, the fluxing agent is added using a specific rack. Two distinct zones can be distinguished around the coated fraction: on contact with the aggregate, the binding film without fluxing agent and on the edges a binding film rich in fluxing agent.

The following examples illustrate the invention but without in any way limiting it.

EXAMPLE 1

Cold Mix Asphalt for Wearing Course Layers

The tests were carried out on dioritic type aggregates. Three granular fractions are proposed: 0/4, 4/6 and 6/10.

The 0/4 cut corresponds to the 0/d fraction according to the invention. The 4/6 and 6/10 cuts are mixed in a ratio of 40%/60%. This new 4/10 cut corresponds to the d/D fraction according to the invention.

The content in elements below 0.063 mm in size is 5.9% by weight.

Different emulsions were manufactured to be processed into mixtures:

TABLE 1

Emulsions of bitumen F1, F2 and F3

| | Formula no. | | F1 | F2 | F3 |
|---|---|---|---|---|---|
| BINDER | Bitumen | Supplier | Total | Total | Total |
| | | Grade | 70/100 | 70/100 | 35/50 |
| | | Content (kg/t) | 600 | 520 | 600 |
| | Fluxing agent | Supplier | — | VFT | — |
| | | Grade | — | Adheflux | — |
| | | Content (kg/t) | — | 80 | — |
| AQEUOUS PHASE | Emulsifiers | Type | Indulin W5/ Polyram S | Indulin W5/ Polyram S | Indulin W5/ Dinoram S |
| | | Supplier | Meadwestva Co/Ceca | Meadwestva Co/Ceca | Meadwestva Co/Ceca |
| | | Content (kg/t) | 4/3 | 4/3 | 9/2 |
| | Hydrochloric acid | Content (kg/t) | 3 | 3.5 | 3.5 |
| | Water (kg/t) | | 390 | 389.5 | 388.5 |

These emulsions were manufactured using a laboratory Atomix C mill.

These bitumen emulsions were used to prepare cold mix asphalt by directly coating solid mineral fractions with F1, F2 and F3 binder emulsions. The temperatures for the aggregates and emulsions are 20° C. for the tests. Total water content for these mixtures is 7 ppc/granular mixture 0/D. The mixes are obtained with an SR Consulting mixer with parallel shafts. The manufacturing volume is 25 kg. The characteristics of cold mix asphalt prepared are given in table 2 below:

TABLE 2

Formulation of M1, M2. M3 and M4 mixes

| Mixture | | M1 | M2 | M3 | M4 |
|---|---|---|---|---|---|
| Aggregates | | 40% 0/d + 60% d/D | 100% d/D | 20% 0/d + 80% d/D | 40% 0/d + 60% d/D |
| Total Water | Content (ppc/ aggregates) | 7 | 4 | 6 | 7 |
| Emulsion | No. | F1 | F2 | F2 | F2 |
| | Content (ppc/ aggregates) | 9 | 7 | 9 | 9 |
| Mixing time (s) | | 15 | 15 | 15 | 15 |
| Observations | | (1) | | (2) | |

(1): With an adapted emulsion without a fluxing agent, a good mix with coating is obtained. Nevertheless, workability (Nynas workability meter; measured according to the method described in the article "Bitumen emulsions for cold mixes: Nynas workability meter test", World Conference on Emulsions, 2002) is over 200 N after 6 H. The void content is very high, ranging from 13 to 18 (Duriez test NF P98-251-4, August 2004 version).

(2): With a fluxed emulsion, and once content in 0/d fraction is at least 20% by weight, a significant decrease in coating quality is noted. As of 25% by weight of 0/d fraction, coating of the 6/10 fraction is poor. M2 mixes do not contain the 0/d mineral fraction and therefore cannot be used in the production of wearing course layers.

To remedy the disadvantages found with mixes M1, M2 and M3, tests in which the mineral fraction mixing steps are sequences and two emulsions are used as well as tests according to the process of the invention (M6-1, M-2 and M6-3) were carried out. The results are given in table 3 below:

TABLE 3

Formulation of mixes M5, M6-1, and M6-2

| Mix | | M5 | M6-1 | M6-2 | M6-3 |
|---|---|---|---|---|---|
| Aggregates | | 70% d/D | 40% 0/d + 60% d/D | | |
| Total water (ppc) | | — | 7 | 7 | 7 |
| Emulsion | No. | F3 | F1 | | |
| | Content (ppc/ aggregates) | 3.5 (/d/D) | 8.2 | | |

TABLE 3-continued

Formulation of mixes M5, M6-1, and M6-2

| Mix | | M5 | M6-1 | M6-2 | M6-3 |
|---|---|---|---|---|---|
| Mixing time T (s) | | 10 | 15 | | |
| Aggregates | | 30% 0/d | — | — | — |
| Total water (ppc) | | 7 | — | — | — |
| Emulsion | No. | F2 | — | — | — |
| | Content (ppc/0/d aggregates) | 6.5 | — | — | — |
| Mixing time (s) | | 20 | — | — | — |
| Fluxing agent | Name | — | Adheflux | | |
| | Content ppc/ aggregates | — | 0.6 (i.e. 11% in fluxed bitumen) | | |
| Mixing time t (s) | | — | 5 | 10 | 20 |
| Observations | | (3) | | (4) | |

(3) Problem with the distribution of the binding film, progressive stripping of the gravel as a function of mixing time. The same defects are found as for mixes M3 and M4 spread out in time.

(4) According to the invention, the fluxing agent is added after production of the mix. Excellent coating is observed after the addition of the fluxing agent and for a mixing time t of 5 to 10 s. The stripping phenomenon start to occur again as of 15 seconds, already observed for mixes M2 to M5.

Following these results, a mix M7, still according to the invention, was produced. The d/D fraction is pre-lacquered with emulsion F3 on D-1. On D, the 0/d fraction (40%) is added+water and the emulsion complement (F1). This is mixed together for 15 s before adding the fluxing agent (Adheflux) for 5 to 15 s. The mix obtained is fully coated and shows good workability after 24 hours.

Water sensitivity tests according to standard NF p 98 241-4 (August 2004 version) were performed on this formula and an r/R ratio of 78% was measured.

The measurements were carried out after a resting time at the end of the process in order to mimic the real conditions of on-site work

The invention claimed is:

1. A process for manufacturing cold mix asphalt consisting of solid mineral fractions coated using an emulsion binder, said binder comprising a fluxing or fluidizing agent, said process comprising:
    a) coating in a mixer at room temperature the totality of solid mineral fractions with an emulsion binder, said emulsion comprising the totality of the binder but not containing the totality of the fluxing or fluidizing agent, for a time period T sufficient to observe coating of the mix; then
    b) adding, at the end of the time interval T, the remaining quantity of fluxing or fluidizing agent, and if need be an additive suited to the nature of the fluxing or fluidizing agent, in a mixer for a time interval t such that the T/t ratio is greater than 2, the other mixing conditions for steps a) and b) being moreover almost identical.

2. A process according to claim 1, wherein steps a) and b) are successive and continuous.

3. A process according to claim 1, wherein steps a) and b) are not successive but are interrupted by storage of the mixes obtained after step a).

4. A process according to claim 1, wherein the fluxing or fluidizing agent is one of petroleum, petrochemical or natural non fossil origin chosen from the group comprised of vegetable oils, derivatives and mixtures thereof.

5. A process according to claim 1, wherein the totality of the fluxing or fluidizing agent is added during step b).

6. A process according to claim 1, wherein the fluxing or fluidizing agent is added in the form of an oil-in-water emulsion, said emulsion not containing the binder.

7. A process according to claim 1, wherein, during step b), an additive adapted to the nature of the fluxing agent is selected from the group consisting of siccatives, cement, lime and calcium chloride.

8. A process according to claim 1, wherein prior to step a), solid mineral fractions undergo a step in the course of which the d/D mineral fraction is coated at room temperature with an emulsion binder.

9. A process according to claim 1, wherein prior to step a) the solid mineral fractions undergo a step in the course of which the Old mineral fraction is coated at a temperature of between room temperature and 100° C. by a binder.

10. A process according to claim 1, wherein the solid mineral fractions include, by weight relative to total weight of solid mineral fractions, at least 20% of the 0/d mineral fraction.

11. A process according to claim 1, wherein the content in elements below the size of 0.063 mm is 2 to 17% by weight, relative to the total weight of the 0/D fraction.

12. A process according to claim 1, wherein the total binder content is 2 to 8 ppc (part percent by weight), relative to the weight of the solid mineral fraction.

13. A process according to claim 10, wherein the solid mineral fractions include, by weight relative to total weight of solid mineral fractions, at least 30% of the 0/d mineral fraction.

14. A process according to claim 11, wherein the content in elements below the size of 0.063 mm is about 2 to 12% by weight, relative to the total weight of the 0/D fraction.

15. A process according to claim 11, wherein the content in elements below the size of 0.063 mm is about 3 to 9% by weight, relative to the total weight of the 0/D fraction.

16. A process according to claim 12, wherein the total binder content is 3 to 7 ppc (part percent by weight), relative to the weight of the solid mineral fraction.

17. A process according to claim 12, wherein the total binder content is 3.5 to 5.5 ppc (part percent by weight), relative to the weight of the solid mineral fraction.

* * * * *